United States Patent [19]

Kawamura et al.

[11] 3,991,332

[45] Nov. 9, 1976

[54] STEPPING MOTOR

[75] Inventors: Yoshikazu Kawamura, Shimosuwa; Hiroshi Eguchi, Suwa, both of Japan

[73] Assignee: Kabushiki Kaisha Suwa Seikosha, Tokyo, Japan

[22] Filed: July 31, 1973

[21] Appl. No.: 384,338

[30] Foreign Application Priority Data

July 31, 1972 Japan.............................. 47-76701

[52] U.S. Cl.............................. 310/49 R; 310/162
[51] Int. Cl.² ........................................ H02K 37/00
[58] Field of Search .......................... 310/162–164, 310/156, 49; 340/378 MW, 378 R; 335/272, 229, 230

[56] References Cited
UNITED STATES PATENTS

| | | | |
|---|---|---|---|
| 2,536,805 | 1/1951 | Hansen, Jr. ....................... | 310/49 X |
| 2,601,517 | 6/1952 | Hammes ........................... | 310/162 X |
| 2,611,799 | 9/1952 | Ackerman ......................... | 310/49 |
| 3,132,558 | 5/1964 | Wymann ........................... | 310/49 X |
| 3,158,796 | 11/1964 | Musgrave ........................... | 335/230 |
| 3,416,015 | 12/1968 | Ordas................................ | 310/49 |
| 3,594,785 | 7/1971 | Orenbuch .......................... | 310/49 X |
| 3,636,557 | 1/1972 | Watkins ............................. | 310/49 X |

*Primary Examiner*—Donovan F. Duggan
*Attorney, Agent, or Firm*—Blum, Moscovitz, Friedman & Kaplan

[57] ABSTRACT

In a motor having a rotor which is a permanent magnet, the rotor is in the form of a cylinder from which portions have been cut forming surfaces symmetrical with respect to the axis of the cylinder. The moment of inertia of the rotor is thereby reduced so that response to a magnetic impulse is more rapid. Further, the plane of magnetism is asymmetric with respect to the plane bisecting the cylindrical surfaces of the rotor, thereby providing for greater thrust under the effect of the yoke and increasing the efficacy of said motor for stepping purposes.

7 Claims, 5 Drawing Figures

DIRECTION OF MAGNETIZATION

DIRECTION OF MAGNETIZATION

DIRECTION OF MAGNETIZATION

STEPPING MOTOR

BACKGROUND OF THE INVENTION

In a stepping motor used as an electromechanical transducer in an electronic timepiece, it is necessary that the motor be as small as possible, that the rotor be located positively within the yoke at each step, and that the motor be easy to assembly and adjust. Moreover, there should be little or no oscillation of the rotor at the termination of a signal or pulse. Finally, the current consumed per step should be a minimum in order that the battery used for powering the motor and thereby the timepiece should last as long as possible.

Motors used for powering timepiece should last as long as possible.

Motors used for powering timepieces have hitherto consumed substantial amounts of current so that the life of a battery powering the timepiece is relatively short. This has been due to the fact that the rotors, in general, have been cylindrical so that the moment of inertia has been a maximum consistent with the size of the opening in the yoke into which the rotor fits. Furthermore, it is desirable that the rotor position itself very difinitely and positively at each reversal of the magnetic field in the yoke. As part of this location process, oscillation of the rotor should be avoided since such oscillation can interfere with the rotation of the rotor in response to the next reversal of polarity. The present invention is designed to overcome these difficulties.

SUMMARY OF THE INVENTION

A motor consists of a yoke and a rotor which is a permanent magnet. The yoke is wound with a coil connected to a source of current which can supply signals in alternate directions, thereby reversing the polarity of the yoke, and causing the rotor to rotate through a selected angle. The yoke has hollowed-out ends which form a socket for receiving the rotor. The ends are displaced slightly from each other so that the gaps between the rotor and the inner surfaces of the socket vary in thickness. As a result, for each polarity of the yoke, there is a position of the rotor corresponding to a minimum in the reluctance of the magnetic circuit formed by the yoke, the gaps between the yoke and the rotor and the rotor itself. It is the presence of this minimum which aids in locating the rotor sharply at a position each time the polarity of the yoke is reversed.

In a preferred form, sections of the rotor are hollowed out, leaving the rotors symmetrical with respect to its axis. The purpose is to decrease the moment of inertia of the rotor, and thereby reduce the power necessary for driving the rotor. Even more preferable is a form of the rotor in which sections are removed as aforenoted, but in which the plane defined by the north and south poles of the magnet and which passes through the axis of the cylinder makes an angle different from zero with the plane passing through the axis of the cylinder and through the center lines of the remaining cylindrical surfaces of the rotor. This displacement of the plane of polarity from the plane of symmetry increases the thrust exerted upon the rotor when the direction of polarization of the yoke is reversed and minimizes oscillation of the rotor after termination of a step signal.

Accordingly, an object of the present invention is a motor having a rotor with a lower moment of inertia than conventional rotors.

Another object of the present invention is a motor having a rotor in which the plane of polarization passing through the north and south poles in the axis of the rotor is displaced from the plane of symmetry passing through the center lines of the cylindrical arcs of the rotor.

An important object of the present invention is a motor having a rotor which comes to rest quickly and at a sharply defined position as the result of a stepping signal.

A significant object of the present invention is a motor of the stepping type sufficiently light in weight so that it is suitable for use in a wristwatch and consuming a minimum of power, thereby extending the life of the battery used to drive said motor.

Still other objects and advantages of the invention will in part be obvious and will in part be apparent from the specification.

The invention accordingly comprises the features of construction, combinations of elements, and arrangement of part which will be exemplified in the constructions hereinafter set forth, and the scope of the invention will be indicated in the claims.

BRIEF DESCRIPTION OF THE DRAWING

For a fuller understanding of the invention, reference is had to the following description taken in connection with the accompanying drawings, in which.

DESCRIPTION OF THE PREFERRED EMBODIMENT

Figure 1:
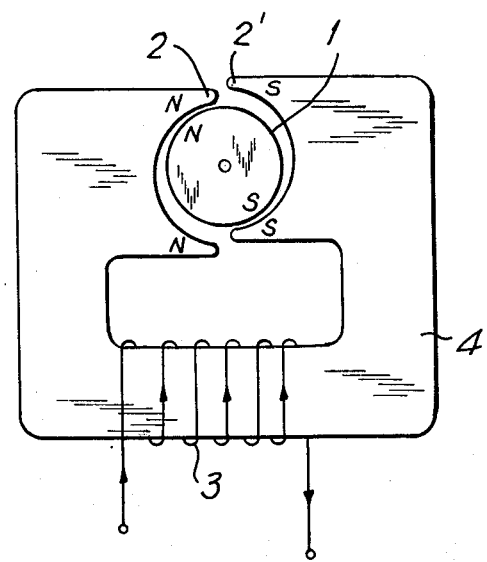
FIG. 1 is a stepping motor having a conventional cylindrical rotor.

A conventional motor having a disc-like or cylindrical rotor 1 is shown in FIG. 1. The rotor is a permanent magnet having North and South poles indicated by the letters N and S in the Figure. However, it must be remembered that it is an end view which is shown so that the letters N and S define a plane of magnetization which passes through the axis of the cylindrical rotor 1.

Driving coil 3 is connectably to a source of voltage which can deliver pulses alternating in direction. Yoke 4 has hollowed out ends forming stators 2 and 2'. The hollow in each stator is semi-cylindrical. However, the alignment of the stators is such that the axes of the two half-cylinders do not coincide but are displaced relative to each other in a direction perpendicular to said axes and in the plane defining said half-cylinders. As a result, the gaps between the rotor 1 and the stators 2 and 2' are not uniform in thickness. Consequently, for a given direction of magnetization of the stators, there is a specific position for the rotor in which the magnetic reluctance of the circuit consisting of the rotor, the gaps between the rotor and the stators, and the yoke is a minimum. In the condition shown in FIG. 1, a signal has just been applied to driving coil 3 as a result of which the left-hand stator has become a north pole and the right-hand stator has become a south pole; since the north pole of the rotor is closer to the top portion of stator 2' than to the bottom portion thereof, the rotor tends to rotate clockwise. The same forces are applied to the south pole of rotor 1. The yoke 4 retains its direction of magnetization during and after application of a driving pulse or signal to driving coil 3, and maintains this direction of magnetization until the next pulse, a reversing pulse is applied. However, once the first pulse is terminated, the rotor will rotate clockwise until the position of minimum magnetic reluctance for the magnetic circuit is achieved so that the rotor will rotate by 180° from the position shown in FIG. 1. However, due to the relatively high moment of inertia of the rotor, it will tend to ride past the position of minimum reluctance and then will be drawn back toward that position, so that oscillation results. If this oscillation persists up to the point where the next signal is applied, then the position from which the rotor starts on its next rotation will be indeterminate, resulting in irregular motion of the rotor. Further, as will be shown below, the energy required to cause the rotor to rotate through 180° is greater than would be the case if the rotor were hollowed out as will be taught below and the thrust applied to the rotor for the given signal will be smaller than would be the case if the rotor were hollowed out as taught in accordance with the present invention.

Adjustment of the poles of the stator relative to each other is best carried out when the yoke is unmagnetized. The adjustment is extrememly delicate since the clearance between the rotor and the stator is not great and above all, because the position at which the stator will come to rest is not clearly defined for a cylindrical rotor. Moreover, this lack of clear definition as to the rest position of the rotor makes the system extremely susceptible to disturbance by external shock.

Figure 2:
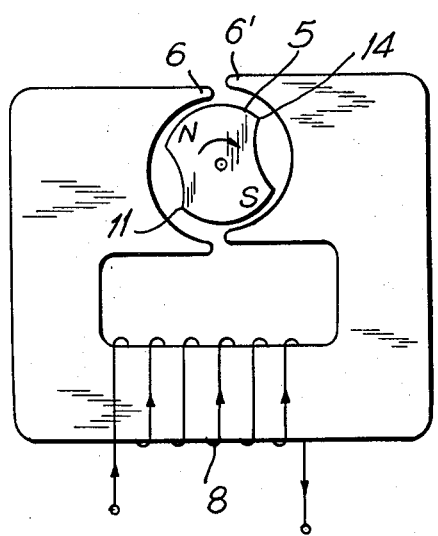
FIG. 2 is a motor in accordance with the present invention having a cylindrical rotor from which sections have been removed.
Figure 3:
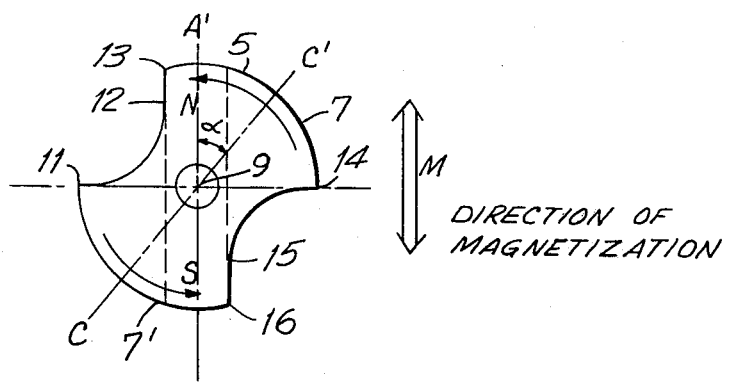
FIG. 3 is a rotor in accordance with the present invention in which the magnetic axis is displaced from the plane defined by the center line of the cylindrical surface arcs of the rotor.

An embodiment which eliminates the above defects is shown in FIG. 2, with the rotor shown in more detail in FIG. 3. The rotor is formed by excision of portions of the cylinder as indicated in end view in FIG. 3. Viewed from the end, cylindrical arcs 7 and 7' are symmetrical with respect to the center 9 of the end surface of the cylinder 5. Line C – C' bisects both cylindrical sections of the rotor and in combination with the axis of the rotor forms a plane bisecting the entire rotor.

In the preferred form, the plane defined by the north and south poles of the rotor and the axis of the rotor makes an angle with the plane labelled C – C', where the angle alpha is different from zero.

In the embodiment shown in FIG. 3, the rotor, in addition to end surfaces, has cylindrical portions 13 – 14 and 11 – 16 which are symmetrical with each other with respect to axis 9 of the rotor, planar segments 15 – 16 and 12 – 13 which are symmetrical with each other and cylindrical sections 11 – 12 and 14 – 15, similarly symmetrical with respect to each other using the axis as the reference line. In the case of the rotor of FIG. 3, planar surfaces 12 – 13 and 15 – 16 are parallel to the axis of magnetization A – A'.

It should be noted that although the rotor 5 of FIG. 2 is shown in more detail in FIG. 3, nevertheless, rotor 5 of FIG. 2 could have cylindrical cut-outs as shown in FIG. 2.

Figure 4:
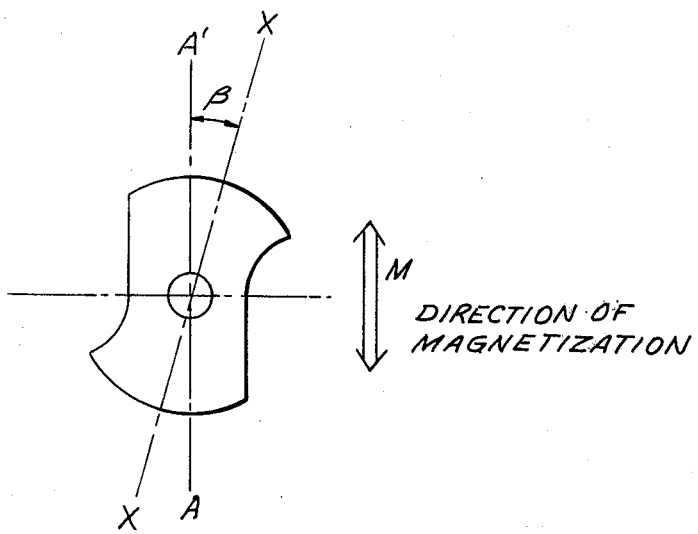
FIG. 4 is another embodiment of the present invention.

Referring specifically to FIG. 3, the direction of magnetization is indicated by the double-headed arrow labelled M which is the direction in which the magnetization is strongest. Since rotor 5 is not symmetric with respect to central plane A – A', it is possible to locate two circular arc portions of rotor 5 at the position of the gap between stators 6 and 6' by adjusting said stators relative to each other. In this case, as compared with the stator using the conventional rotor as shown in FIG. 1, the adjustment of stator 6 and 6' is relatively simple because of the fact that there is a wide range over which the adjustments can be made with the arrangement being operative. In the embodiment shown in FIG. 2, when coil 8 is pulsed as marked by the arrow, the portion of the rotor which is most strongly magnetized is repulsed. In addition, since the attractive portion of the other stator (top portion of stator 6' and bottom portion of stator 6) acts upon the portions 14 and 11 which are the parts of the circular arcs furthest from the axis A – A' the rotor is driven with a torque substantially greater than is the case with a conventional cylindrical rotor. Accordingly, the current required for producing a given torque is smaller when the rotor is hollowed out as indicated generally in FIGS. 3, 4 and 5 and when the plane of magnetization lies at an angle to the plane through the center lines of the opposed remaining cylindrical surfaces.

Further, since the moment of inertia of the rotor is decreased by removing portions of the rotor, the speed of response is increased and the pulse width necessary for driving the rotor can be decreased so that the consumption of energy is decreased sharply. Moreover, the design of the rotor with the decreased moment of inertia and with the more sharply located plane of magnetization greatly reduces the tendency of the rotor to oscillate subsequent to stepping action.

Another version of a cut-out rotor is shown in FIG. 4 where again, the direction of magnetization does not coincide with the plane through the center lines of the opposed cylindrical surfaces remaining, the plane of symmetry with respect to the opposed cylindrical surfaces being identified by the line X — X, the plane of magnetization being defined by the line A – A' and the angle between the two lines being beta.

Figure 5:
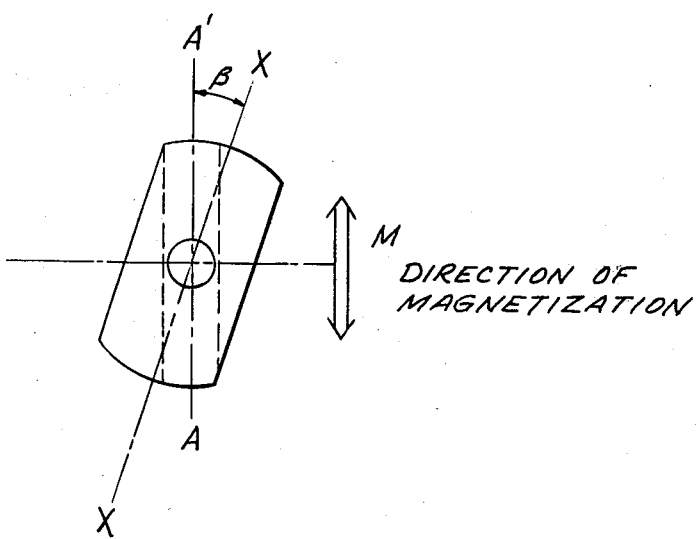
FIG. 5 is yet another embodiment of a rotor in accordance with the present invention.

Another modification is shown in FIG. 5 where the rotor is faced-off so that it is shaped essentially like a bar magnet except that two opposed cylindrical surfaces remain.

It should be noted that hollowing out the rotor leaving the periphery untouched will not produce as great a result as cutting away from the periphery of the rotor because of the fact that the moment of inertia will not be decreased as greatly. Also, while stepping motors of the type shown herein are particularly applicable to use in wristwatches and other timepieces, the same principle can be applied to larger motors such as those used for stepping switches in telephone relays and for applications requiring substantially greater torque.

It will thus be seen that the objects set forth above, among those made apparent from the preceding description, are efficiently attained and, since certain changes may be made in the above article without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In a motor the improvement comprising a permanent magnet rotor having a magnetic axis, said rotor being adapted to rotate about the mechanical axis thereof the rotor being uniformly cross-sectioned in the axial direction to define two concentric symmetrical circular arcs having equal radii and reduced radii portions intersecting said circular arcs' surfaces said reduced radii portions being symmetrically formed with respect to each other, the axis of magnetization of the rotor defining a plane intersecting at a specific angle an imaginary plane bisecting the symmetrically formed arced surfaces said intersection occuring at the rotor's axis.

2. The motor as claimed in claim 1 wherein said reduced radii surfaces are symmetrical with respect to the axis of said rotor.

3. The motor as defined in claim 2 and including a yoke having opposed first and second ends, each hollowed out approximately in the shape of a half-cylinder, the axes of said half-cylinders being parallel to each other but spaced apart in a direction perpendicular to said axes and in the plane defining said half-cylinders, the diameters of said cylinders being sufficiently large so that said rotor can rotate freely within the hollows of said yoke, the combination of said yoke and said rotor thereby providing a position for said rotor in which the reluctance of the magnetic circuit consisting of said yoke, gaps between said yoke and said rotor is a minimum.

4. The motor as claimed in claim 2, wherein said plane defined by said magentic axis intersects said circular arced surfaces.

5. The motor as claimed in claim 2, wherein said reduced radii surfaces are planar.

6. The motor as claimed in claim 5, wherein said magnetic axis defines north and south poles.

7. The motor as claimed in claim 2, wherein said reduced radii surface project symmetricallly toward the rotor's axis.

* * * * *